Nov. 21, 1950 E. BOECKING 2,530,448
PAD ROLLER DEVICE FOR MOTION-PICTURE
PROJECTING MACHINES
Filed April 19, 1946 4 Sheets-Sheet 1

Inventor
Ewald Boecking
BY HIS ATTORNEYS
Howson and Howson

Nov. 21, 1950    E. BOECKING    2,530,448
PAD ROLLER DEVICE FOR MOTION-PICTURE
PROJECTING MACHINES

Filed April 19, 1946      4 Sheets-Sheet 3

Inventor
Ewald Boecking
BY HIS ATTORNEYS
Howson and Howson

Nov. 21, 1950 E. BOECKING 2,530,448
PAD ROLLER DEVICE FOR MOTION-PICTURE
PROJECTING MACHINES
Filed April 19, 1946 4 Sheets-Sheet 4
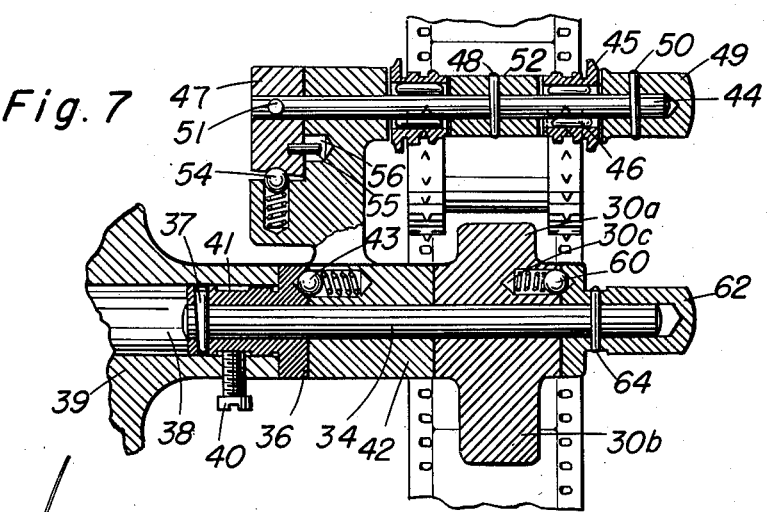
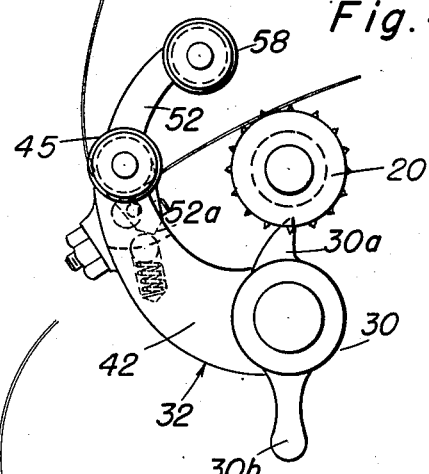
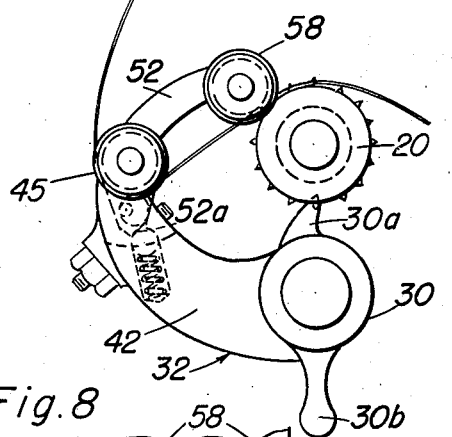
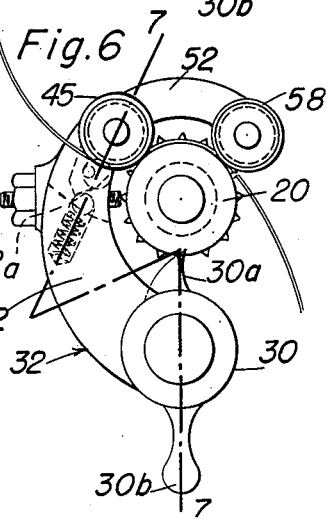
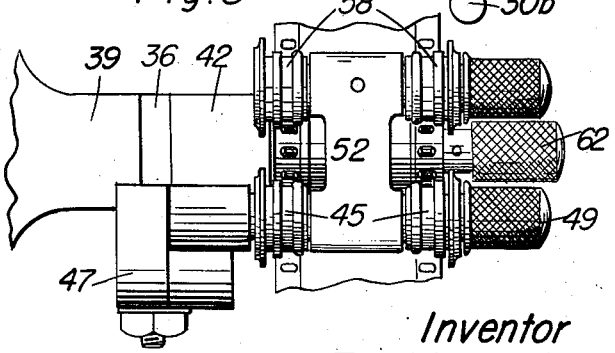
Inventor
Ewald Boecking
BY HIS ATTORNEYS
Howson and Howson Patented Nov. 21, 1950

2,530,448

UNITED STATES PATENT OFFICE 2,530,448

PAD ROLLER DEVICE FOR MOTION-PICTURE PROJECTING MACHINES

Ewald Boecking, Great Kills, N. Y., assignor to Manufacturers Machine & Tool Co., Inc., Mount Vernon, N. Y., a corporation of New York Application April 19, 1946, Serial No. 663,429

9 Claims. (Cl. 271—2.3)

This invention relates to pad rollers for moving picture projecting machines and it is an object of this invention to provide such a projector with a pad roller device of improved construction which will facilitate the threading of the film in the machine, prevent improper engagement of the film with the film sprockets associated with the pad rollers and provide means for rapidly and positively ensuring the necessary extent of film slack to be left after the threading of the film for proper operation of the projector.

In the drawings:

Figs. 4, 5 and 6 are views in side elevation of the lower pad roller device shown detached from the machine, the pad roller being shown in opened position for the threading of the film; in film loop measuring position; and in operating position, respectively;

Fig. 7 is a partial sectional view of the structure shown in Figs. 4, 5 and 6 taken as on line 7—7 of Fig. 6; and Fig. 8 is a view in elevation, looking from the left in Fig. 4.

Figure 1:
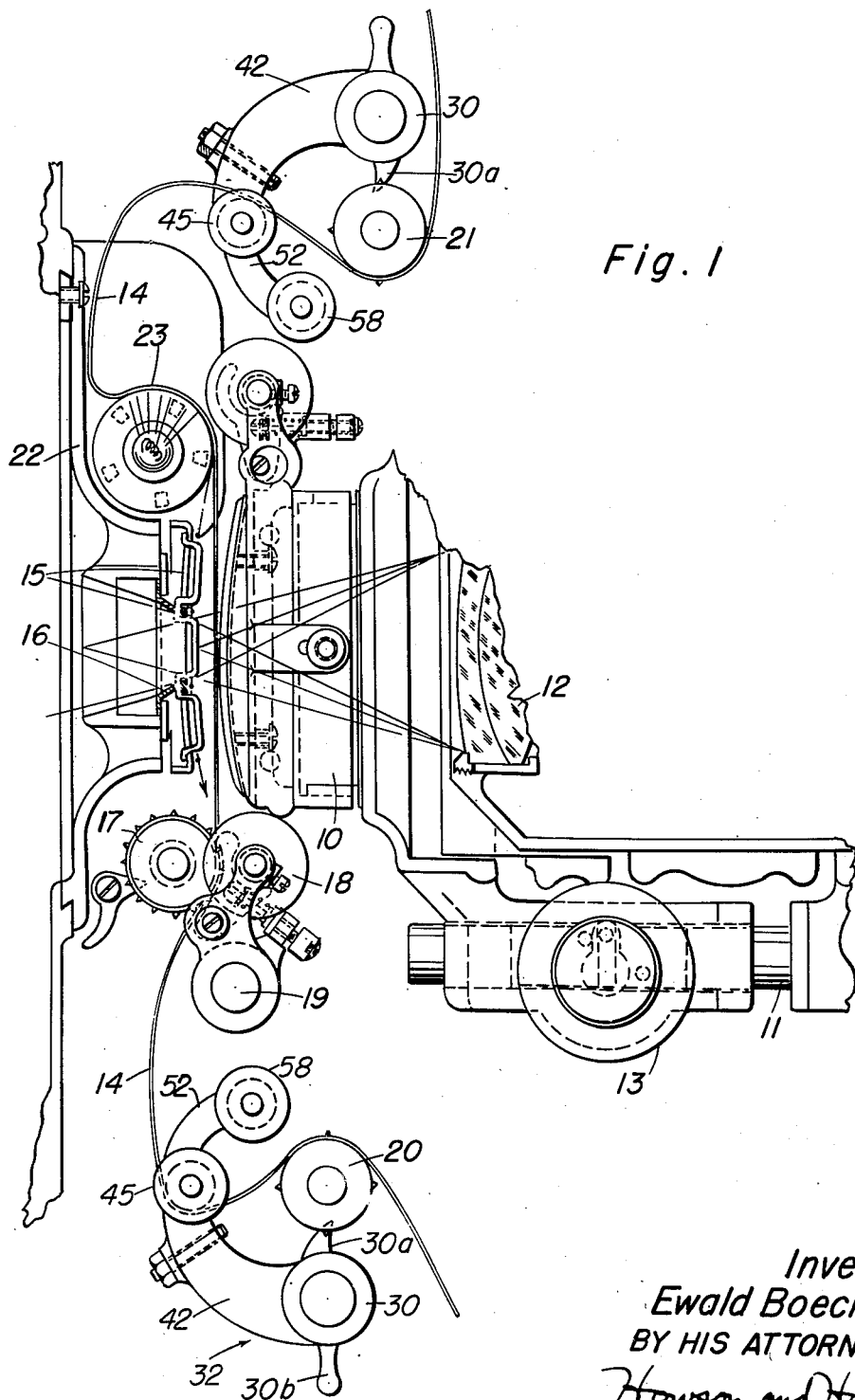
Fig. 1 is a view in side elevation, part'y cut away, of a film gate and associated parts including pad rollers in accordance with this invention, the gate and pad rollers being shown in opened position for the threading of the film.

In commercial motion picture projectors in which the film is advanced intermittently, it has been difficult to thread up the machine at the beginning of the film owing to the necessity of maintaining the film in contact with the various advancing sprockets while adjusting the film loops to the desired size and in proper registry.

In the drawings the invention is shown in connection with a motion picture projector having a film gate 10 carrying lenses 12 and movably mounted on a bar 11, movement of the film gate 10 on the bar 11 to facilitate threading of the film being control'ed by a suitable mechanism 13. As shown, the source of light is at the left and the screen at some distance to the right and the film gate has the usual projection aperture corresponding to the light aperture 16. The film 14 is placed between the film gate 10 and the pressure shoes 15 and light aperture 16. The usual intermittent driving sprocket wheel 17 has a film guiding roller 18 which is pivotally mounted at 19 below the film gate and a hold- back roller and film registry means 23 is mounted on the usual plate 22 which carries the pressure shoes 15 and on the opposite side of the film 14 from the film gate 10. Above the film gate, and separate therefrom, is a film sprocket wheel 21 for advancing the film continuously to the film gate while below the film gate is the film sprocket wheel 20 which takes the film supplied intermittently by the sprocket wheel 17 and delivers it continuously to the winding reel or sound producing apparatus.

Associated with the sprocket wheels 20 and 21 are pad roller devices of improved construction, each pad roller comprising a stripper mechanism 30 and roller means 32 rotatably mounted on a pin 34 fixed in a flanged sleeve 36 by a cotter pin 37. The sleeve 36 is inserted in an opening 38 formed in a boss 39 projecting from the projector frame or casing (not shown) and is secured in position by a set screw 40 engaging in a groove 41 in the outer surface of the sleeve 36. The ro'ler means 32 comprises an arm 42 pivotally mounted at one end on the pin 34 and provided with spring pressed balls or detents 43 which engage in recesses in the flange of sleeve 36 and hold the arm 42 in adjusted position. At its other end the arm 42 is provided with an opening in which is mounted a pin 44 which projects to both sides of the arm 42 and has thereon at one side of the arm 42, pad rollers 45 mounted on roller bearings 46 journaled on the pin 44 and separated by one end of an arm 52 secured to the pin 44 by a cotter pin 48. The outer roller 45 is held in position on the pin 44 by a knob 49 secured to the pin 44 by a cotter pin 50. The pad rollers 45 are positioned to be aligned with the teeth of the sprocket wheel and are formed with the usual grooves to receive the sprocket teeth and flanges at one side to serve as guides for the film on the sprocket.

To the pin 44 at the other side of the arm 42, a cotter pin 51 secures an arm 47, having one end beveled on both sides, as at 52a and positioned so as to have the beveled faces engaged by a spring-pressed ball or detent 54 mounted in a lug or projection on the arm 42 and which serves to retain the arms 47 and 52 in adjusted position. The point of the bevel 52a can be considered as dead center for and unitary with the arm 52. The arm 47 is also provided with a short pin 55 which projects into a recess 56 formed in the arm 42 and limits the pivotal movement of the arms 47 and 52. At its outer end the arm 52 has fixed therein a pin on which is mounted a plurality of spaced rollers 58 shaped as are the rollers 45 to receive the sprocket wheel and guide the film thereon as do the rollers 45.

The stripper 30 mounted on the pin 34 comprises a member having a tapered film engaging portion 30a which extends to a position closely adjacent the sprocket wheel and, in case of a break in the film, prevents the wrapping of the film on the sprocket. The stripper also has an operating handle portion 30b and, on one side, a recess 30c in which is mounted a spring-pressed ball or detent 60 positioned to engage in recesses in the flange of a knob 62 fixed on the pin 34 by a cotter pin 64. The stripper 30 is separate from the pad roller support arm 42 permitting movement of the pad rollers 45 and the auxiliary pad rollers 58 away from the sprocket wheel to facilitate threading the film in the machine while the stripper 30 is left in its operative position to prevent the film being placed on the sprocket wheel improperly.

Figure 2:
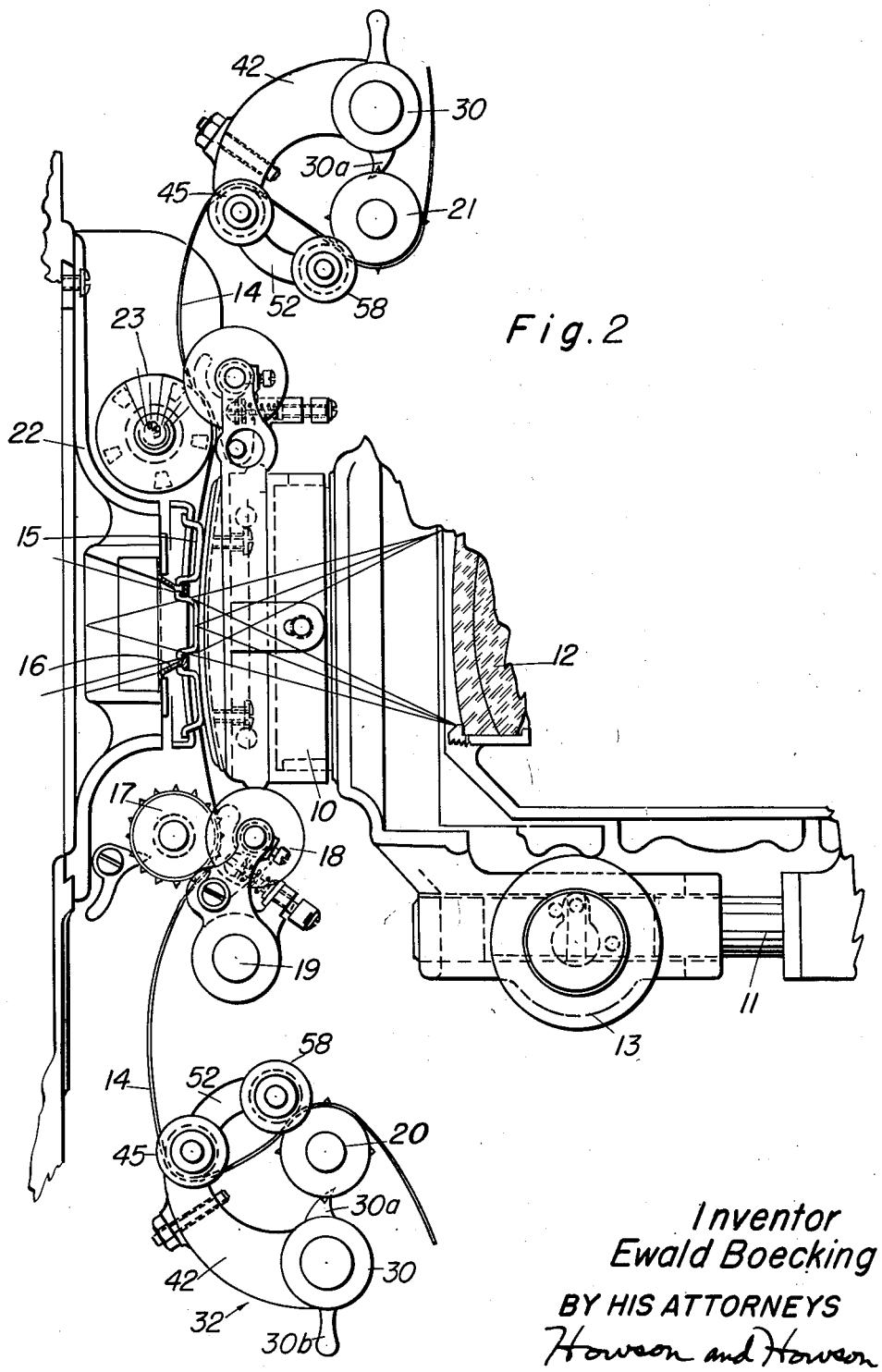
Figs. 2 and 3 are views similar to Fig. 1 with the film gate shown in closed position and with the pad rollers in position to measure the film slack loops in Fig. 2 and in operating positions in Fig. 3.
Figure 3:
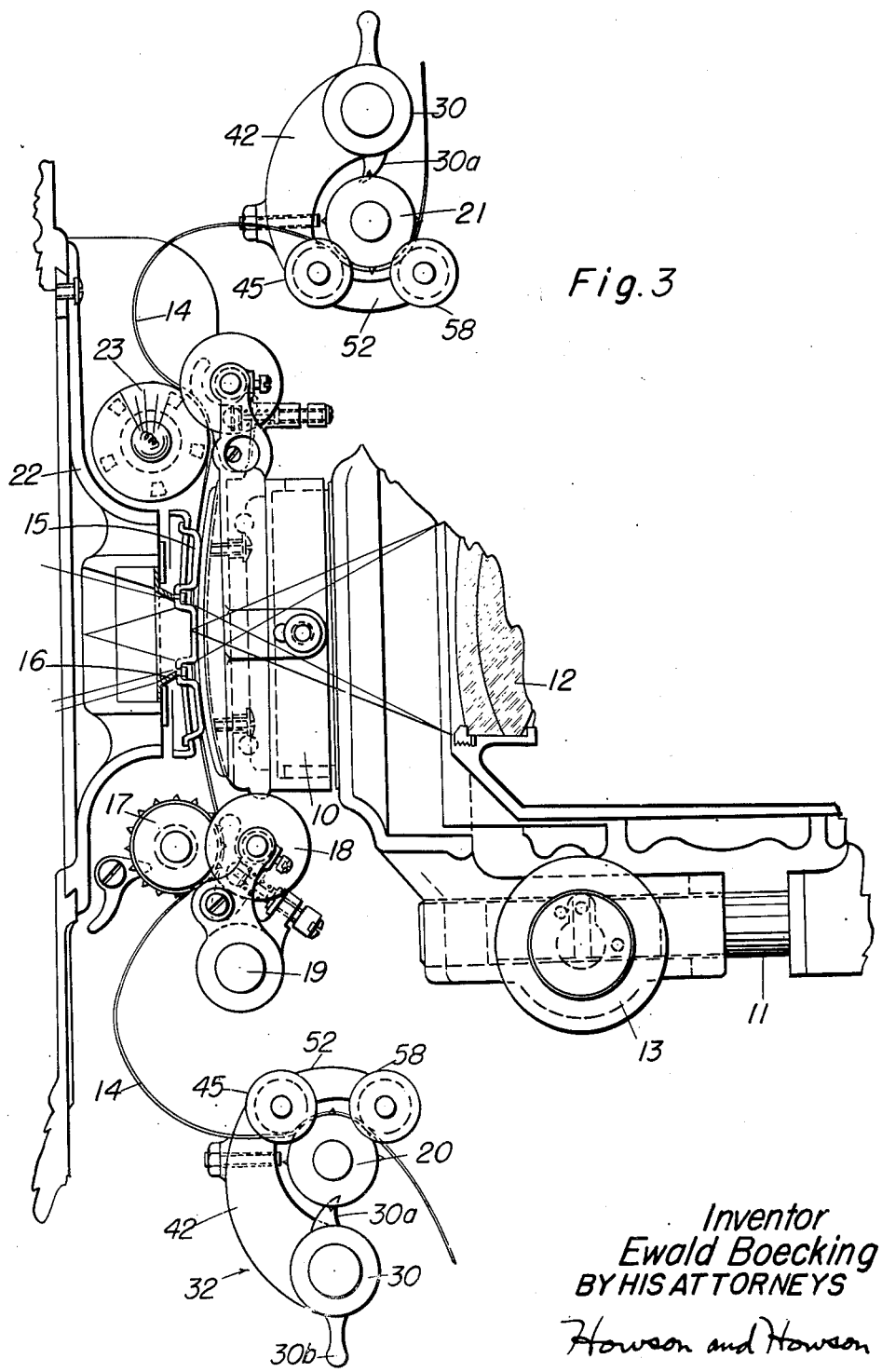

In threading film in a moving picture projector equipped with pad rollers in accordance with this invention, the pad roller arms 42 and 52 are rotated on their supports to the positions shown in Figs. 1 and 4, the film gate 19 is moved to the right on its support 11; the roller 18 moved from the intermittent driving sprocket 17, the light of film registry means 23 is lighted and a sufficient length of film to reach the film take-up drum is drawn. The film is then placed around the upper driving sprocket 21 and over its pad rollers 45, through the film gate 10, loosely around the intermittent drive sprocket 17 and around the lower drive sprocket 20 after passing below its pad rollers 45. The auxiliary pad rollers 58 of the lower and upper drive sprockets 20 and 21 are then engaged with the sprockets, as shown in Figs. 2 and 5, to keep the film alined in its running course. The film is then registered with the film registry means 23 and engaged with the teeth of the intermittent drive sprocket 17, the sprocket 17 being at the end of a movement. The roller 18 is closed on the intermittent sprocket 17 and the film gate 19 is closed. The slack loops in the film are then determined by drawing the film gently over the pad rollers 45 and their associated sprockets 21 and 20 with the rollers 58 lifted from the sprockets. With the film drawn snug, the rollers 58 are first brought into contact with the sprockets 21 and 20 by moving the arms 52 and then rollers 45 are brought into contact with the sprockets 21 and 20 by moving arms 42, the detents 54 keeping the rollers 58 in contact with the sprockets as the rollers 45 are engaged, the rollers 58 being moved from the positions shown in Fig. 2 to the positions shown in Fig. 3. The film 14, when drawn snug on the rollers 45 and sprockets 21 and 20 has a position as shown in Fig. 2 but when the rolls 45 are moved to engage the sprockets slack loops, as shown in Fig. 3, are left in the film, the length and position of the arms 42 being such that the slack loops are of the proper size for operation of the machine.

Whenever it is necessary to remove one of the sprockets the handle 30b of the stripper is used to turn the stripper so that its film-engaging position 30a is out of overlapping relationship with the sprocket. Then the sprocket can be removed without dismantling the stripper.

What I claim is:

1. In a motion picture projector, a film-advancing sprocket, a pad roller for engaging said sprocket, a pivotally mounted arm for supporting said pad roller in a film and sprocket-engaging position, an auxiliary roller for holding film on said sprocket when said pad roller is spaced therefrom, and means pivotally supporting said auxiliary roller on the pad roller arm on an axis parallel to the sprocket axis, said auxiliary roller being adapted to have movement toward and from the sprocket independently of the pad roller.

2. In a motion picture projector, a film-advancing sprocket, a pad roller for engaging said sprocket, a pivotally mounted arm for supporting said pad roller in a film and sprocket engaging position and a film-measuring position spaced from said sprocket, an auxiliary roller for holding film on said sprocket when said pad roller is spaced therefrom, and means pivotally supporting said auxiliary roller on the pad roller arm on an axis parallel to the sprocket axis, said auxiliary roller being adapted to have movement toward and from the sprocket independently of the pad roller.

3. A motion picture projector according to claim 1, in which the means supporting the auxiliary roller comprises a second arm pivoted on the pad roller arm on an axis parallel to the sprocket axis to carry the auxiliary roller, and there is a loop-measuring position for the first pivotal arm when the pad roller is spaced from the sprocket, and there are means adapted to hold the auxiliary roller in film-engaging contact with the sprocket when the pad roller is in loop-measuring position.

4. A motion picture projector according to claim 3 in which the means to keep the auxiliary roller in contact comprises resilient means tending to keep the auxiliary roller in film-engaging contact with the sprocket when the pad roller is both out of and in film-engaging contact with the sprocket.

5. A motion picture projector according to claim 4 in which the resilient means is connected at such points with relation to the pivot point of the auxiliary roller as to permit the second arm to be swung away from the sprocket.

6. A motion picture projector having a film-advancing sprocket, a pad roller for engaging said sprocket, a pivotally mounted arm for supporting said pad roller in a film and sprocket-engaging position, an auxiliary roller for holding film on said sprocket when said pad roller is spaced therefrom and a second arm carrying the auxiliary roller pivoted on the first arm on an axis parallel to the sprocket axis in combination with resilient means normally tending to keep the auxiliary roller in film-engaging contact with the sprocket when the pad roller is both out of and in film-engaging contact with the sprocket, said resilient means having a dead center beyond which it is adapted to hold the second arm away from the sprocket.

7. A motion picture projector according to claim 6 in which there is present in the resilient means a bevelled point unitary with the pivot end of the second arm and spring means pressing on the point tending to keep the auxiliary roller in contact with the sprocket or swung away from it according to the side of the point on which it is pressing.

8. In a motion picture projector according to claim 1, the provision of stripper means adapted to retain a position preventing application of the film on the wrong side of the sprocket during threading up, said stripper means being pivotable out of such position independently of said two arms when it is desired to remove the sprocket.

9. In a motion picture projector according to claim 8, the pivoting of the stripper means on the same axis as the pad roller arm, the stripper means being adjacent the periphery of the sprocket on the side opposite the two rollers.

EWALD BOECKING.

REFERENCES CITED

The following references are of record in the file of this patent:

UNITED STATES PATENTS

| Number | Name | Date |
| --- | --- | --- |
| 1,957,164 | Frappier et al. | May 1, 1934 |
| 2,073,225 | Ross et al. | Mar. 9, 1937 |